April 26, 1949. A. E. DE LOS MONTEROS 2,468,046
APPARATUS FOR PROJECTING AND VIEWING
IMAGES WITH DEPTH EFFECTS
Filed Oct. 16, 1947 2 Sheets-Sheet 1
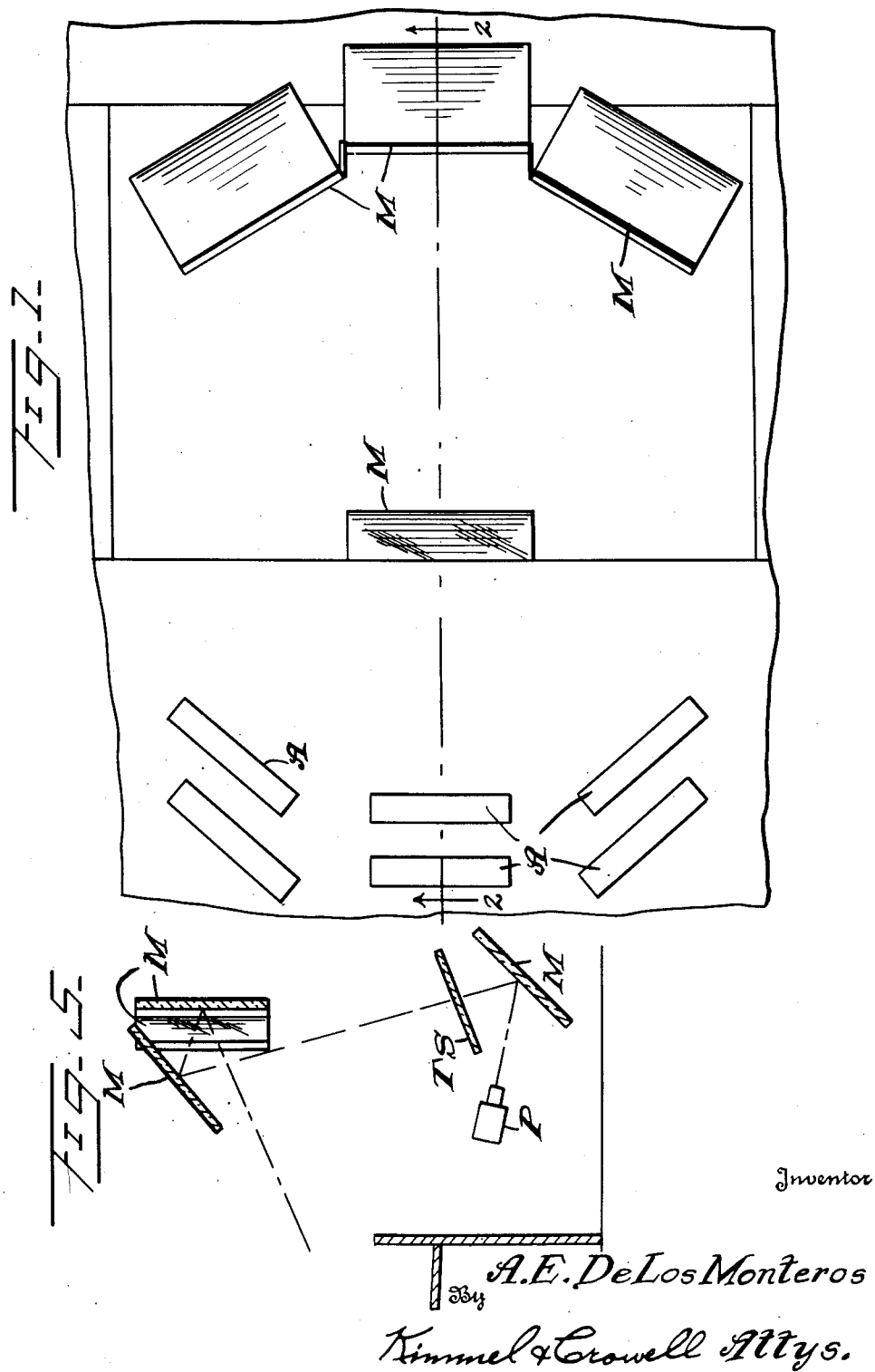
Inventor
A. E. De Los Monteros
By Kimmel & Crowell Attys.

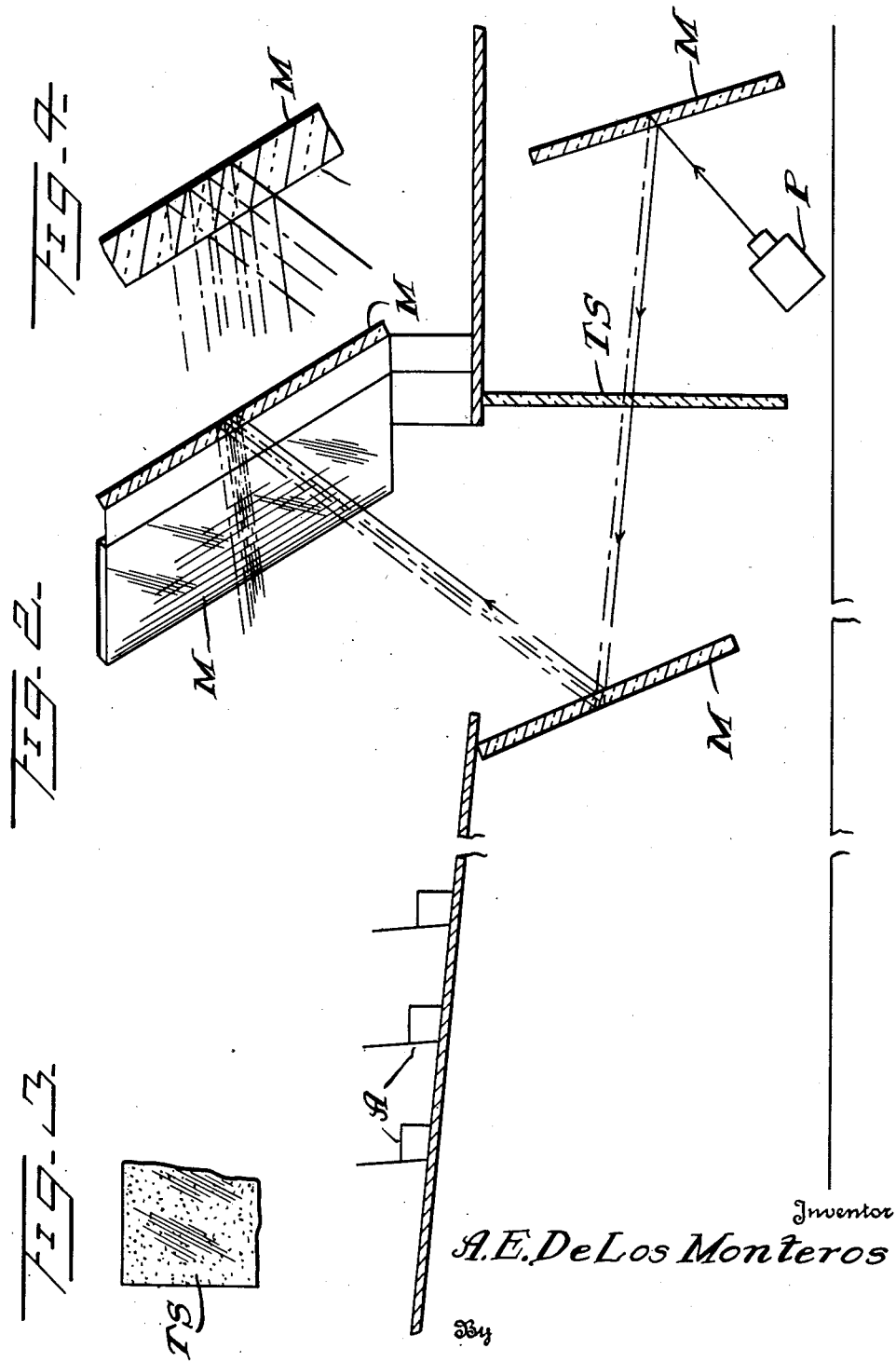

Patented Apr. 26, 1949

2,468,046

UNITED STATES PATENT OFFICE 2,468,046

APPARATUS FOR PROJECTING AND VIEWING IMAGES WITH DEPTH EFFECT

Antonio Espinosa de los Monteros, Washington, D. C., assignor of one-half to Eugenio de Anzorena, Washington, D. C., and Mexico City, Mexico Application October 16, 1947, Serial No. 780,192

3 Claims. (Cl. 88—16.6)

This invention relates to an apparatus for projecting and viewing images with depth effect, generally referred to as a third-dimensional effect, and is applicable to either still pictures or motion pictures, with equal value and good results.

It is a known phenomena that a tri-dimensional effect or impression of depth can be obtained by splitting an image or projected picture, but heretofore the methods employed have been generally unsatisfactory, or at least lacking in the optimum desired results.

My system of obtaining the illusion of depth depends on a displacement or splitting of the image, but essentially on a novel arrangement of mirrors, more specifically mirrors having the customary silver or like deposit or coating on one side of a sheet of heavy or plate glass. It is essential that the mirrors shall be more than just simple reflectors and that there shall be an appreciable thickness as this thickness and the reflection of the image from the rear of the mirror as well as through the glass and from the surface thereof is a means of obtaining a splitting or displacement of the image.

To illustrate the practical use or application of my invention, its use is described hereinafter in connection with the projection of both still and moving images, viz., those cinematographic films known as "stills" and the motion pictures.

The present conventional method of projection consists in the reflection of images upon an opaque screen. The images originating in or produced by projection from the film are projected onto the screen and thereon are viewed by the audience. With my method and apparatus the image (or images) issuing from the projector is first projected against a mirror, of the kind I have described, which is positioned at an oblique angle with respect to the point of emission of the pictures from the projector, and from said mirror to a translucent screen, thence to another or a series of other properly positioned mirrors, the image being then viewed in one or more of said mirrors. A few illustrative typical arrangements are shown herein. It will be noted that instead of going directly to a screen and thereon being viewed by the audience, the image is first projected at an oblique angle onto a mirror and is twice reflected from the mirror or in each of a series of mirrors, by reason of the fact that each mirror consists of two surfaces, referred to as its anterior and posterior surfaces.

In order that the audience may be able to see the image thus reflected, the mirror or series of mirrors are placed at predetermined angles in relation to each other and to the screen. The same image is reflected from the anterior surface and from the posterior surface of the first mirror, to the second mirror and to the other mirrors in a series. In the first mirror, due to the reflection from two surfaces, the image is split so that in the second mirror two images are seen, one slightly out of registry with the other, this depending on two factors, the thickness of the first mirror and the angle at which the projector is placed with respect thereto. In the successive mirrors, the double image from the first is each time also reflected from two surfaces, the anterior and the posterior, the image thus multiplying itself in each successive mirror. Each mirror reflects in this manner, the original image from a different angle, and by reason of the angle in which the mirror is placed, it reflects an image from its posterior surface and another more tenuous image from its anterior surface. The two images are of different intensity, and even though their areas generally are superimposed, they are slightly displaced, i. e., each point of light of the original image produces two points of light, one more intense and the other more tenuous, slightly out of registry, which produces the illusion of depth or stereoscopy. The principle on which my invention is based differs completely and radically from the explanation and theories generally accepted to produce the stereoscopic phenomenon.

In its simplest form my invention contemplates a projector for the image, a mirror at a convenient angle to produce the phenomenon desired, and an ordinary screen. As there is thus a slight distortion of the image, it is desirable to use a second mirror to receive and reflect from the first mirror, which besides correcting the distortion, accentuates the stereoscopic effect for the reasons hereinbefore stated. A larger number of mirrors can also be used, always at the proper angles, to facilitate viewing the image and to enhance the effects.

The degree of displacement between the images reflected by the two faces of each of the mirrors is necessarily in relation, first, to the angles at which the mirrors are placed with respect to the screen and projector and from each other; second, to the thickness of the mirrors; and third, to the index of refraction of the transparent materials of which the mirrors are made. These three factors must in each case be precisely determined according to the use to be made of the apparatus to produce the best stereoscopic effects. It will be noted that while the second and third factors are important, the first, viz; the angularity at which the different elements of the apparatus are placed with respect to each other is most important as thereby is obtained the displacement of the images, etc. To merely obtain two images as by having the mirror parallel to the intermediary screen is not sufficient.

While the thickness of my mirror is preferably at least one-quarter inch, this is not necessarily a fixed figure. It may be more or less, this being determined by the results.

Referring to the drawings, which it will be understood are schematic and for purposes only of general illustration, Figure 1 shows a top plan of a typical theatre installation embodying one of my arrangements of projector and mirror systems, wherein all seats in the theatre are good seats as regards the view of the images by the audience, Figure 2 is a section on line 2—2 of Figure 1, Figure 3 is a fragmentary detail of the screen, Figure 4 is an enlarged fragmentary detailed view of a mirror showing how the reflection of the image is multiplied.

Figure 5 is a detailed sectional view showing an arrangement of my invention utilizable in an installation similar to that of Figure 1.

In the several views, the letter M indicates a flat mirror having an appreciable thickness and having the usual silver or like coating on one side, the mirror thus being provided with anterior and posterior reflecting surfaces. The letter P represents the projector, still or motion picture. The letters TS indicate a translucent screen.

In Figure 1, the projector P is at an oblique angle with respect to its adjacent mirror. The image is reflected from this mirror to the translucent screen in front of it which is arranged at the required angle to collect the light rays from the mirror. From the screen TS, the image goes to the mirror in back of it. This latter mirror is arranged at a suitable angle to collect the light rays and the image thereon is a split image, that is, several images each of different intensity and slightly out of registry with each other to give the depth or shadow-like effect. From this second mirror positioned in the pit, the images are reflected to the on-stage mirror in which the audience views the picture or pictures with depth effect. Each time the image is reflected from one mirror to the other, it is split due to reflection both from the anterior as well as the posterior surfaces of the mirrors. The phenomena hereinbefore described is thus obtained.

The installation in Figure 2 exemplifies the arrangement which is seen in plan view in Figure 1.

The installation in Figure 1 depicts a system of several mirrors whereby the several parts of the audience A, according to seating arrangement, can view the pictures, each on a separate mirror screen. It will be noted that the center mirror is back of the two side mirrors. Each section of the audience can view the pictures in a separate mirror without interference from the other mirrors.

In Figure 3 there appears a fragment of the translucent screen TS showing a coated surface but the coating is not essential.

Figure 5 is a schematic illustration of a system to accomplish the effects in Figures 1 and 2.

It will be understood that the arrangement of Figure 5 is possible in the illustrations Figures 1 and 2.

What I claim is:

1. The invention as herein described comprising in combination a projector, a first mirror having anterior and posterior reflecting surfaces at an acute angle to said projector for reflecting a projected image from each of said surfaces, one image slightly displaced with respect to the other, a translucent screen placed to receive such reflected images and a second mirror receiving, similarly multiplying, and reflecting the images from the screen onto a third mirror on which said several images are collected and presented for audience viewing and giving depth illusion by reason of the multiplication and slight displacement of said images, said projector, first mirror, second mirror and screen remote from said third mirror and out of view of the audience.

2. The invention as herein described comprising in combination a projector, a first mirror having anterior and posterior reflecting surfaces, said mirror at an angle other than a right angle to said projector for reflecting a projected image from each of said surfaces, one image slightly out of registry with the other, a screen placed to receive such reflected images and a second mirror also having anterior and posterior reflecting surfaces receiving, similarly multiplying, and reflecting the images to a third mirror surface whereon they may be viewed, the multiplication and slight displacement of the images creating an illusion of depth to the viewer, all but the last mirror out of view of said viewer.

3. The invention as herein described comprising in combination a first mirror having anterior and posterior reflecting surfaces for receiving an image to be viewed, said mirror at an angle other than a right angle with respect to said received image, for reflecting said image from each of said surfaces, one image slightly displaced with respect to the other, a screen placed to receive said reflected images and a second mirror also having anterior and posterior reflecting surfaces, receiving, similarly multiplying, and reflecting said images to a third mirror on which said several images are collected and presented for audience viewing and giving depth illusion by reason of the multiplication and slight displacement of said images, said first and second mirrors and screen remote from said third mirror and out of view of the viewer of said collected images on said third mirror.

ANTONIO ESPINOSA DE LOS MONTEROS.

REFERENCES CITED

The following references are of record in the file of this patent:

UNITED STATES PATENTS

| Number | Name | Date |
| --- | --- | --- |
| 2,184,641 | Glanz | Dec. 26, 1939 |
| 2,252,467 | Luzzati | Aug. 12, 1941 |

FOREIGN PATENTS

| Number | Country | Date |
| --- | --- | --- |
| 392,134 | France | Sept. 16, 1908 |
| 971 | Great Britain | Jan. 13, 1913 |
| 506,097 | France | May 21, 1920 |
| 183,441 | Great Britain | July 12, 1923 |
| 705,892 | France | Mar. 17, 1931 |
| 5,931 | Australia | 1932 |
| 656,759 | Germany | Feb. 14, 1938 |